United States Patent [19]

Troyer et al.

[11] 4,149,320

[45] Apr. 17, 1979

[54] BUILDING CONSTRUCTION MEASURING TAPE

[76] Inventors: Daniel Troyer, Rte. #10, Box 254; Elliott Reeke, 321 Dixie Ave., both of Harrisonburg, Va. 22801

[21] Appl. No.: 823,445

[22] Filed: Aug. 10, 1977

[51] Int. Cl.² ............................................. G01B 3/10
[52] U.S. Cl. ..................................... 33/137 R; 33/111
[58] Field of Search ................ 33/137, 138, 107, 111

[56] References Cited

U.S. PATENT DOCUMENTS

| | | | |
|---|---|---|---|
| 888,848 | 5/1908 | Rapson | 33/111 |
| 2,187,087 | 1/1940 | Leary | 33/137 R |
| 2,242,286 | 5/1941 | Boughton | 33/111 X |
| 2,563,674 | 8/1951 | Coots | 33/138 X |
| 2,742,705 | 4/1956 | Gelardi | 33/137 R |
| 2,904,891 | 9/1959 | Cook | 33/111 |
| 3,136,067 | 6/1964 | Horner | 33/137 R |
| 3,210,850 | 10/1965 | Grzyb | 33/137 R |
| 3,470,574 | 10/1969 | Heitman | 33/137 R |

FOREIGN PATENT DOCUMENTS 894293  4/1962  United Kingdom ................. 33/137 R

*Primary Examiner*—Harry N. Haroian
*Attorney, Agent, or Firm*—Schwartz, Jeffery, Schwaab, Mack, Blumenthal & Koch

[57] ABSTRACT

Disclosed is a measuring tape and a method for its use which eliminates the necessity for manual measurement in the construction of buildings. The measuring tape comprises a pressure-sensitive adhesive tape having a minimum stretchability, which is adapted to be permanently secured onto a suitable base, and which has imprinted thereon at least one numerical scale and a plurality of a spaced series of coded indicia for use as templates to position particular structural members.

6 Claims, 4 Drawing Figures

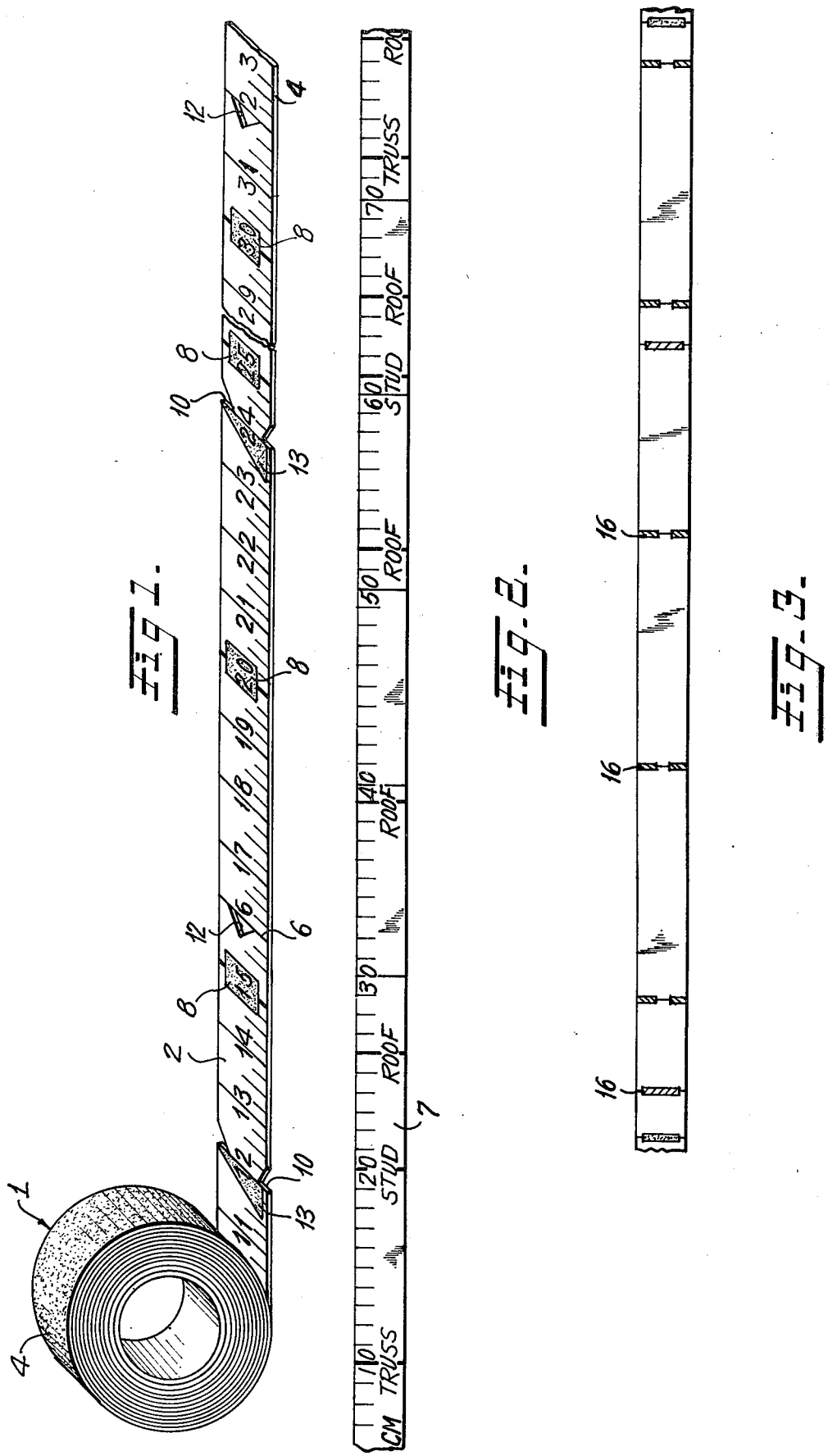

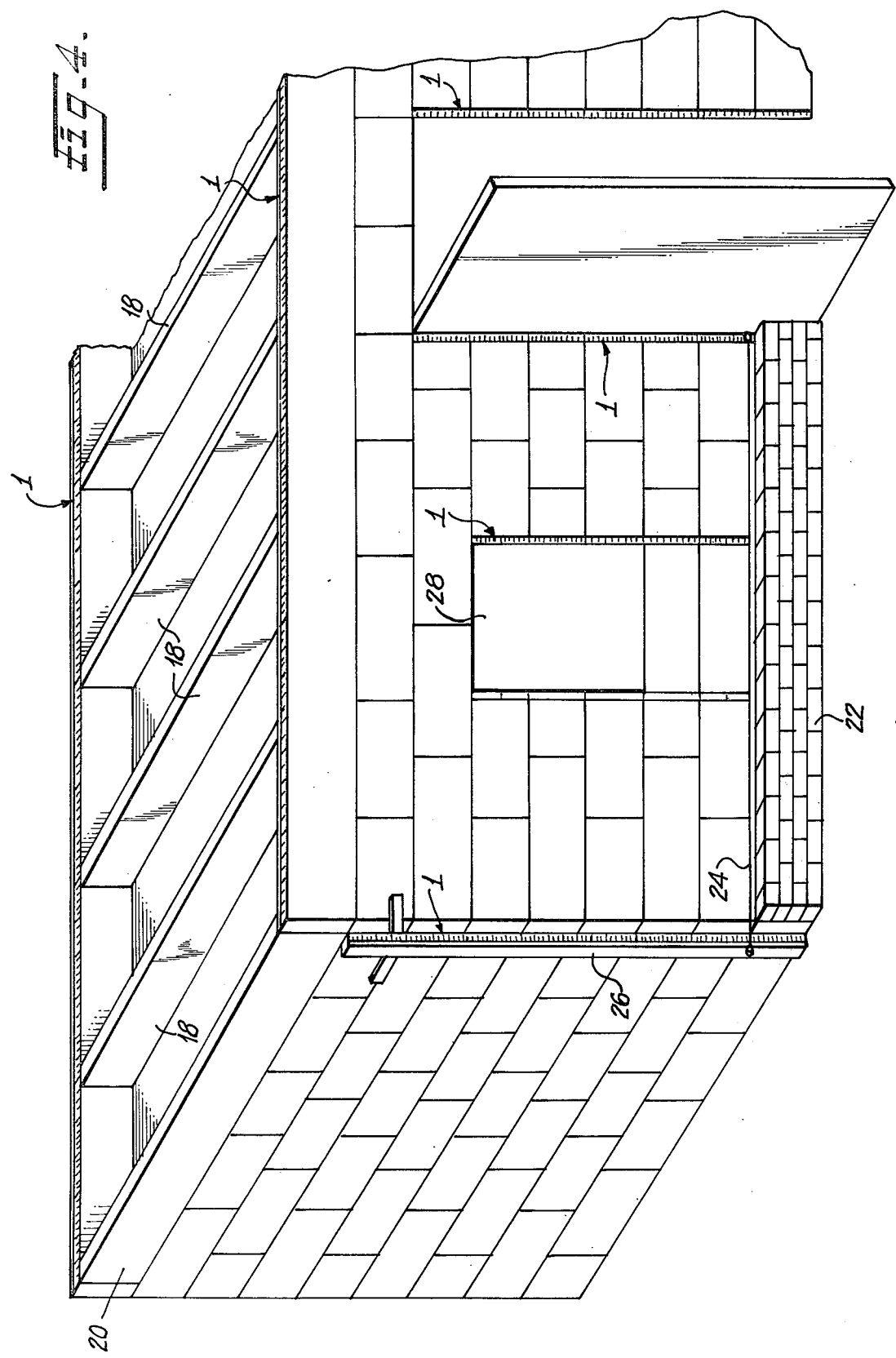

BUILDING CONSTRUCTION MEASURING TAPE

BACKGROUND OF THE INVENTION

The present invention relates to a disposable measuring tape and template which has improved ease of use over prior art tapes, and which eliminates the necessity for manual measurement. The instant invention is suitable for use in any situation in which conventional measuring devices are employed. However, the present invention is particularly advantageous when utilized as a template or guide in the construction of buildings or other static structures to indicate the placing of the structural members which comprise the completed frame structure without the necessity of manually measuring the proper spacing for each member. It is additionally advantageous for use in masonry applications. More particularly, the instant invention is highly suitable for use as a guide to directly obtain without error the proper positions of studding, beams, trusses, metal members, and the framing of structural openings such as door, window, stairwells, vents, etc., in the construction of buildings and other structures, without the necessity of manually measuring the proper positioning and spacing of these members. It is also highly suitable for obtaining the proper spacing between courses in masonry applications. As a further aspect, the present invention provides a method for utilizing the measuring device of this invention to completely manufacture structural frames, including the framing of structural openings, without the necessity of manual measurement or resort to a plurality of measuring or geometric devices. Through use of the instant measuring device, the present invention further provides a facile method for erecting joists within a structural frame, and for determining the proper spacing between each row of bricks in the manufacture of masonry walls, particularly around structural openings therein, without the necessity for a plurality of manual measurement operations.

The prior art has long recognized that flexible measuring tapes, such as canvas measuring tapes or flexible metal measuring tapes, may be advantageously employed in a plethora of common applications. However, the necessity of holding these devices stationary in order to obtain a true measurement often renders their use awkward, particularly where no assistance is available and large distances must be measured. Moreover, the use of these devices entails a manual measurement operation, which can be very time consuming and a significant source of costly errors, particularly in construction applications, where a large number of measurements must be made over long distances. Accordingly, the deficiencies associated with these devices render their use for many applications, such as construction applications, undesirable.

Heretofore, the prior art has been unable to develop an effective substitute for the canvas or flexible metal measuring tapes which eliminates the need for manual measurement and is facilely utilized. U.S. Pat. No. 2,187,087 discloses one prior art attempt to develop such a measuring device which comprises a length of gummed or plain tape of paper or gauze adapted to be secured to a suitable base member and having imprinted thereon a set of indicia which corresponds to the desired spacing of a particular structural member, such as studdings, in the construction of buildings. For positioning other structural members, such as beams, trusses, and the like, a separate tape is employed for each member; each tape having imprinted thereon a set of indicia which corresponds to the desired spacing of the particular structural member.

The flexible template disclosed in this patent, however, suffers from numerous deficiencies which militate against its use in situations in which precise measurements are required, such as in construction applications. The high stretch of the paper or gauze backing of this tape produces a systematic measurement error which becomes increasingly more serious the longer the length of tape employed, and becomes a significant source of error with large construction jobs, sometimes resulting in errors of such magnitude that costly correction is necessary. Moreover, the use of a plain or gummed tape prevents this template from being readily utilized, particularly where long distances must be measured. The workman using this device must either wet the tape before its application to a base member or secure it by means of other suitable extraneous fastenings.

The most significant deficiency from which this template suffers, though, is that in the construction of building frames a plurality of such tapes must be employed for each particular structural member, and other geometric devices must be resorted to in order to center and position the frame members of structural openings within a building frame. For example, in order to position the framing for window openings, the patentee resorts to a supplemental template having a numerical scale, i.e., an inch scale, displayed thereon in order to space the window frame members a desired distance. Even with this provision, however, a standard measuring device must still be resorted to in order to properly center the structural opening within the building frame proper. Use of the patentee's template therefore does not eliminate the necessity for manual measurement. In order to manufacture a complete building frame with the patentee's template, a plurality of templates having indicia corresponding to the desired spacing of the building structural members, and additional measuring devices having numerical scales displayed thereon must be employed. Rather than simplifying the measurement operation in building construction, therefore, use of the patentee's templates only complicates the matter and presents an additional systematic source of measurement error over that found in conventional canvas or flexible metal measuring tapes.

It would be desirable therefore to provide a measuring device which eliminates the need for manual measurement, which is facilely employed, which enables the manufacture of an entire structural frame without resorting to other measurement devices, and which does not suffer from systematic measurement errors attributable to a high stretch.

SUMMARY OF THE INVENTION

It is therefore an object of the instant invention to provide a new and improved measuring device which eliminates the necessity for manual measurement, has a minimum stretch, is easily usable by a single workman and does not require the use of additional measuring devices therewith.

It is an additional object of the present invention to provide a measuring tape for use in the construction of buildings and other static structures which enables the entire structural frame to be manufactured without resorting to a plurality of such devices or to other measuring devices.

Still another object of the instant invention is to provide a method for the manufacture of static structrual frames having structural openings therein using the measuring device of the instant invention.

A further object of the present invention is to provide a method whereby a single workman may properly locate the spacings of joists in the construction of static structures without the necessity for manual measurement.

Yet another object of the instant invention is the provision of a method whereby masonry structures can be erected without the necessity for a plurality of manual measurements.

It is a specific object of the instant invention to provide a pressure-sensitive adhesive measuring tape having at least one numerical scale displayed thereon and a plurality of sets of coded indicia corresponding to the desired spacing of a plurality of structural members.

Yet another object of the instant invention is to provide a pressure-sensitive adhesive measuring tape which has a minimum stretchability, thereby eliminating systematic measurement errors.

A further object of the present invention is to provide a measuring tape which has displayed thereon templates for a plurality of structural members which are coded so as to be easily identifiable.

Yet another object of the instant invention is to provide, as an article of manufacture, a novel packaging of this measuring tape which reduces stretching of the tape during application to a substrate.

In accomplishing the foregoing and other objects, there has been provided in accordance with the present invention a measuring device which alleviates all of the aforementioned deficiencies found in the prior art and also eliminates the necessity for manual measurement, which device comprises a length of pressure-sensitive adhesive tape having a low stretchability, adapted to be permanently secured onto a suitable base, and which has imprinted thereon at least one numerical scale and a plurality of sets of spaced series of coded indicia for use as templates to position particular structural members. Preferably, the numerical scale is a recurring scale, repeating itself at convenient intervals. In the preferred embodiment, moreover, the measuring device of the instant invention is produced in rolls having the adhesive layer outermost and the face with the indicia thereon innermost to allow the device to be directly rolled onto a substrate without the necessity of first having to unroll a length of the tape for application, in order to minimize stretching of the tape backing during application. Furthermore, the templates for the plurality of structural members are each coded so as to easily identify the proper positioning for the particular structural member which is to be erected.

The instant invention also provides a method for utilizing this measuring device, which enables a complete structural frame to be manufactured using a single supply of the instant measuring device without resorting to other measuring devices. More particularly, the present invention provides a method whereby the measuring device of the instant invention functions as a template or guide to indicate the spacing and proper positions of both structural members and the framing of structural openings without resorting to other measuring devices. This method comprises the steps of: adhering the measuring device onto a suitable base member upon which the structural frame is to be erected; employing the numerical scale of the measuring device to center the openings within the frame and to position the frame membes defining the openings; and employing the coded spaced series of indicia as templates to position the remaining structural members necessary to complete the structure. In the preferred embodiment, the structural openings are centered by reading off the proper distance on the numerical scale. The opening frame members are then positioned by counting off ½ the desired width of the opening in each direction from the center line of the opening on the numerical scale.

As a further embodiment of the instant invention, a method is also provided for spacing joists in building construction without the necessity of manual measurement. This method comprises applying the measuring device of the instant invention along opposite stringers of a building frame, and positioning the joists thereon by aligning the ends thereof with the corresponding points on each length of the measuring device.

In still a further embodiment of the instant invention, a method is provided for obtaining the correct spacing between rows of masonry in the manufacture of masonry structures, without the need for manual measurement. This method comprises applying along opposite mason's poles a length of adhesive measuring tape of the instant invention having a recurring mason's scale therein; and beginning at the same marking on each pole, stretching a mason's guide line between corresponding indicia on each of the poles.

Through the use of the measuring device and method according to the present invention, the measurement required in the construction of static structures, particularly buildings, is greatly simplified and the possibility for measurement errors is greatly reduced. Moreover, the number of measurement devices necessary to complete the measurement operation is also greatly reduced, as well as the manpower required to obtain true measurements. A single roll of the measuring device of the instant invention provides everything necessary for the measurement operations required in building construction, and can be nailed through, sawed through, welded across, and is designed to be readily disposable.

Yet other objects and advantages of the present invention will become apparent to the skilled artisan upon examination of the following detailed description of the present invention, taken in conjunction with the figures of drawings herein:

BRIEF DESCRIPTION OF THE DRAWING

FIG. 1 is a perspective view of a roll of tape according to the instant invention with an adhesive layer on the outermost face and the printed side on the inner face.

FIG. 2 is a plan view of a length of the measuring tape according to the instant invention illustrating several forms of coding the various sets of indicia so as to be readily distinguishable.

FIG. 3 is a plan view of a section of the measuring tape of the instant invention illustrating coding the indicia by means of embossments.

FIG. 4 is a perspective view of a part of a frame structure illustrating the use of the instant invention for positioning, spacing, and centering floor joists, and for leveling and laying out the proper spacing between each course of bricks in the erection of a masonry wall having openings passing through it.

DETAILED DESCRIPTION OF THE PREFERRED EMBODIMENTS

The present invention provides a measuring device and a method for its use which is particularly adapted for application in the construction of buildings and other static structures to indicate the desired spacing of the structural members which comprise the structural frame without the necessity for manual measurement. However, while the measuring device of the instant invention is particularly advantageous in building construction, it is highly suitable for use in any measurement operation. The measuring device according to the present invention can be utilized in any situation in which conventional measuring devices find utility. For example, in addition to construction uses, the instant measuring device is suitable for use in police work, sporting events, household use, and surveying. It is further useful in schools teaching teching measurements, conversions from the English system to the metric system, hobbies, hand-free measuring, do-it-yourselfers, and with cutting machinery such as that found in shops, etc. It is also highly useful for performing error-free measurements in manufacturing applications, sewing applications, and as a template to perform measurements of fixed length without the necessity of manual effort. In short, the measuring device of the instant invention may perform any measurement operation presently performed with conventional apparatus, and with a reduced possibility of error, higher accuracy, and with a greater ease of use than that encountered with conventional measuring apparatus.

Referring to the drawings, FIG. 1 illustrates one embodiment of the measuring device contemplated by the instant invention. This device comprises a pressure-sensitive adhesive tape generally indicated at 1 of an inexpensive material. Any inexpensive pressure-sensitive adhesive tape may be employed in the instant invention, which possesses a stretchability which is sufficiently low to prevent unacceptable variations in measurement over the distance to be measured and which is preferably less than about ¼ inch in 50 feet. Applicant has found that the high stretchability of prior art measuring tape produces a systematic measurement error which can reach a significant magnitude when long lengths of the tape are employed. Accordingly, by providing a pressure-sensitive adhesive tape which has minimum stretchability, measurement error attributable to the stretching of the tape can be eliminated and the accuracy of the measurement operation greatly improved. This result is particularly advantageous in those applications which require very precise measurement accuracy, and eliminates the necessity to institute ameliorative action or corrective action to compensate for this error. Moreover, where the measuring tape functions as a template to indicate the placing of structural members without manual measurement, it is essential that a highly accurate spacing be obtained without the necessity of manually checking the accuracy of the spacing.

As has been aforementioned, any tape material which has a stretchability of less than ¼ inch in 50 feet may be employed as the pressure-sensitive tape material in the measuring device of the instant invention. By way of example, the following materials have a stretchability below this value and are suitable for use in the present invention: polyester, such as polyethylene terephthalate (e.g., mylar), polyolefins such as polyethylene and polypropylene, cellulose acetate, polyvinylidene fluoride, polypropylene copolymers, polyvinylchloride, nylon, reinforced plastics, e.g., nylon filament reinforced plastics, metal foil, low-stretch papers, and other well known equivalents.

In the preferred embodiment, the tape 1 includes a pressure sensitive adhesive face 4 and a working face 2 to facilitate application. The adhesive forming the face of tape 1 may be any pressure-sensitive adhesive material well known to those skilled in the art. Preferably, however, the adhesive is also water-repellant to enable the tape 1 to remain firmly adhered to a suitable base object under wet conditions.

The tape 1 may also be secured onto a suitable substrate by any supplementary means well known to the art. For example, it may be stapled, nailed, or clamped onto a substrate. Any of these methods are particularly suitable where an adhesive tape won't stick to the desired substrate in one or more places along its length.

The working face 2 has displayed thereon at least one numerical scale, and a plurality of sets of spaced indicia which function as templates to indicate the spacing of any member which is desired to be regularly arranged. In construction application, these members suitably include floor joists, siding, rafters, trusses, plywood sheets, shingles, beams, studding, metal reinforcing rods, metal I-beams, and masonry or brick. The present invention is also highly advantageous for marking mason's corner poles. However, a set of spaced indicia may be displayed on the face 2 corresponding to the spacing of any desired member, and the present invention is not limited in use to construction applications. Exemplary of other members which are often desired to be set out in an ordered fashion, and would therefore benefit from the advantages of the instant invention, include grade stakes for surveying, surveying poles, fence posts, and any of the wide variety of markers which are ordered in a regular fashion.

As used herein, the term numerical scale refers to any of the various scales in which units of length are set off numerically, such as metric scales, inch and foot scales, etc. Essential to the instant invention is the requirement that at least one numerical scale be displayed on the working face 2. Suitably, this scale may be an inches and feet scale. However, the present invention also contemplates that a metric scale may be employed as the numerical scale. In the preferred embodiment, though, the measuring device of the instant invention includes both a metric scale and an inches and feet scale to allow a single measuring device to perform both types of measurements, and/or assist in conversions from the English scale to the metric scale and vice versa. Preferably, the numerical scales are also recurring scales, repeating themselves at convenient intervals such as 100 feet, etc. For masonry work, the tape 1 preferably includes a recurring mason's scale, repeating itself at four foot intervals.

The numerical scales and the spaced indicia may be displayed on the working face 2 by any method well known to those skilled in the art. For example, these scales may be displayed by printing, stamping, embossing, or perforating. Notching may also be employed where convenient. Whatever method is chosen, though, it is desirable to manufacture the measuring tape with the numerical scales and spaced indicia easily distinguishable. Accordingly, in the preferred embodiment, the numerical scales are imprinted on the pressure-sensitive adhesive tape numerically. Any other suitable indicia may then be employed to mark the spacings of the desired numbers. Preferably, one set of indicia comprises a set of spaced notches. Use of notches as the indicia corresponding to the desired spacing of a particular structural member serves the additional purpose of facilitating the tearing of the tape with neat edges. As will become more apparent hereinafter, the numerical scale and the spaced indicia cooperate to enable the facile construction of building frames without the necessity of manual measurement and without resort to other measurement devices.

Any number of sets of spaced indicia may be displayed on the working face 2. However, when indicia corresponding to the spacing for more than one member are present, it is essential that the indicia corresponding to each member be easily distinguishable from the indicia for other members. Accordingly, applicant has found that this may be suitably achieved by coding the various sets of indicia.

FIG. 1 illustrates one embodiment of the measuring device according to the instant invention, adapted for use in construction applications. On the working face 2 there is displayed a numerical inches and feet scale 6 and four sets of indicia corresponding to the desired spacing of four different members. One set of indicia, indicated by notches 10 provides a template for indicating the standard spacing of steel members in construction applications. A second set of indicia, coded by perforations 12 sets forth the standard 16-inch spacing for studding. A third set of indicia, comprising colored squares 8, forms a template for the spacing of roof rafters. The fourth set of indicia, indicated by colored triangles 13, sets forth the standard 24-inch spacing for trusses. Any method, however, may be employed to code the indicia. For example, all of the various sets of indicia may be color coded, or may employ other distinctive indicia. FIGS. 2 and 3 illustrate two other means for coding the sets of indicia. In FIG. 2, shown with a metric scale 7, the desired spacings of roof beams, studdings, and trusses are respectively indicated by imprinting the member's name on the working face 2. FIG. 3 illustrates another method of coding, in which distinctive embossments 16 distinguish the various sets of indicia.

Preferably, the tape 1 is manufactured in the form of a roll of a convenient size, and is adapted to be adhesively secured to a suitable base member which is to be measured. By employing a pressure-sensitive adhesive tape, ease of use of the instant device is greatly improved over that obtained with prior art measuring devices. With the use of the instant measuring device, a single man can perform the measuring operation, without the need for assistant or extraneous fastenings to secure the tape to a base member. Moreover, applicant has found that measurement accuracy can be even more improved over that obtained with prior art devices by producing the tape in a roll having the adhesive layer outermost and the imprinted layer on the inner face of the roll, as illustrated in FIG. 1. Manufacture of the roll of tape in this form, allows the device to be directly rolled onto a suitable base member without the necessity of first having to unroll a length of the device for application. By applying the tape directly onto the base member without first unrolling, stretching of the tape is further reduced and concomitantly the measurement accuracy of the device is improved. It is also convenient when the instant measuring device is in the form of a roll to manufacture the tape with every ten feet or meters mark on the numerical scale being left blank to allow the user to insert the proper number. This provision eliminates the necessity of having a number of such measuring devices in various lengths for different sized measuring jobs.

As has been aforementioned, the instant invention is particularly advantageous for use in the construction of static structures and building frames. In application, the instant measuring device is adhered upon the top surface of a suitable base member along the portion upon which structural members are to stand. The spaced sets of coded indicia then indicate directly to the workmen the proper location or spacing for the structural members which are to be erected upon the base member. Usually in building construction, studding is spaced on 16-inch centers, trusses are spaced on 24-inch centers, and shingles are spaced at 5-inch intervals. The indicia on the measuring device 1 would ordinarily correspond with this spacing; however, the indicia may be such as will correspond with any desirable spacing. With the use of the instant measuring device, the spacing of studding members may be directly obtained without manual measurement and with reduced opportunity for error by positioning the studding above the indicia corresponding to this member. Moreover, use of the instant invention enables the spacing of studdings to be checked at a glance without the necessity for re-measurement, and eliminates errors resulting from confusion as to the proper mark, etc.

Use of the intant measuring device also enables structural openings to be centered within a building frame and the structural members defining the opening to be spaced without the necessity for manual measurement and without the assistance of additional geometric devices. To center the opening, one corner of the structure is established as a reference point. The proper distance from this point to the desired center of the opening is then read off along the numerical scale to determine the center line of the opening. The spacing of the opening frame members may then be readily obtained by counting off ½ the desired width of the opening in each direction from the center line of the opening. In usual practice, in the construction of building frames, the structural openings are first centered and the members defining the openings erected using the method outlined above. The sets of coded spaced indicia are then utilized to indicate the spacing for the other structural members necessary to complete the structure.

Use of the measuring device of the instant invention also provides a particularly advantageous method whereby the spacing of joists in building frames may be easily and accurately performed by a single workman without the necessity of manual measurement. As shown in FIG. 4, to properly space the joists 18, the measuring tape of the instant invention I is simply applied along two parallel sides of the building upon suitable stringers 20 beginning with the same marking on each side.

Starting at one end of the building, the workman need then only align the ends of the joists with the corresponding marks on each of the lengths of the measuring tape to obtain the proper spacing and positioning for each member, accruing thereby a significant savings in time and manpower over conventional methods of erecting joists, and eliminating the opportunity for measurement errors.

As also illustrated in FIG. 4, the instant invention is also highly advantageous in masonry work, and provides a facile method for erecting masonry structures with greatly reduced manual effort. Heretofore, in conventional methods for erecting masonry, in order for the masonry rows to correspond with the height of desired openings, the spacing for each course or row of masonry 22 required that a separate measurement be made for each new course and the guide line 24 then be leveled between two mason's poles. This method was particularly cumbersome where offset openings such as doors or windows prevented stringing a single guide line across the structure. Where an offset opening was present, it was the practice to string a guide line on each side of the offset opening and hope that the different guide lines were level, producing many measurement errors.

With the use of the instant measuring device, however, an entire masonry structure can be erected without the requirement for manual measurements and with reduced measurement error. A length of the instant measuring tape 1, bearing a recurring mason's scale thereon, is applied along each mason's pole 26 and along each desired opening, beginning from a single level line and also from the same marking on each length of tape. The correct and accurate spacing for each course of masonry may then be obtained by stretching the guide line 24 between similar marks on the mason's poles 26 and on the desired openings, thereby automatically providing the correct spacing and leveling for each row, as the guide line is progressively raised, with a great savings of time and manpower and increase in accuracy. Moreover, the mason will be able to readily calculate and prearrange the proper spacing of courses in order to properly accommodate openings in a wall, such as windows and doors which have uneven vertical placement.

By utilizing the instant measuring device and its accompanying method in the construction of building frames, the construction and measurement process may be greatly simplified. The entire measuring operation may be done by one man, utilizing a single disposable tape measure which is fixed in place and remains throughout and after the construction procedure. This is in contradistinction to the use of the template disclosed in U.S. Pat. No. 2,187,087 which requires that a plurality of templates be employed, and which also accrues appreciable measurement error due to the stretching of the template material. By employing the instant measuring device, only a single measuring device is required to completely manufacture a frame structure. The provision of both numerical scales and spaced indicia on a single measuring device allows the facile determination of the location and spacing for structural openings and other structural members without the necessity of a plurality of measurement steps or devices. Accordingly, the use of the instant invention in construction applications greatly simplifies the construction process, provides a rapid means for verifying all measurements and eliminates all of the aforementioned deficiencies encountered with prior art measuring devices.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A measuring device for use in the construction of static structures to indicate the proper positioning of structural members without the necessity for manual measurement, comprising a tape member manufactured of a disposable material which has a low stretchability in order to reduce measurement error and inaccuracy, and having on one side thereof a pressure sensitive adhesive material to permit easy application, said tape member being thereby adapted to be permanently secured to a substrate, and said tape member having displayed thereon a plurality of scales, at least one of said scales comprising a numerical scale of a repeating series of numerical figures having the last numerical figure in each series omitted for subsequent addition of the appropriate figure by a user in order to enable a single roll of said measuring device to perform a plurality of different sized measurement operations, and the remainder of said scales comprising a plurality of templates for automatically positioning structural members without the necessity for manual measurement, each of said templates being individually coded so as to be easily distinguishable and comprising a coded spaced series of indicia having a spacing corresponding to the desired spacing of a particular structural member, at least one of said templates comprising a series of combined indicia-tearing means for simultaneously coding each particular structural member to be positioned and for facilitating tearing of said tape at a lateral right angle, the indicia of each template being positioned on said tape member offset from the desired position of each structural member, but juxtaposed thereto, such that upon positioning of each structural member, at least a portion of each of said indicia remains visible, in order to allow the proper positioning of each member to be visually checked after it is in place without the necessity for remeasurement.

2. The device recited in claim 1, wherein said templates are coded in the form of triangles.

3. The device recited in claim 2, wherein said templates are color coded to distinguish the proper positioning of each of the structural members to be positioned.

4. The device recited in claim 1, wherein said combined indicia-tearing means comprise notches or distinctive cut-out sections of said tape member.

5. The device recited in claim 4, wherein said distinctive cut-out sections of said tape comprise cut-out triangles.

6. The device recited in claim 1, wherein said adhesive tape has a stretchability of less than about ¼ inch in 50 feet.

* * * * *